United States Patent [19]

Spence-Bate

[11] 4,080,065
[45] Mar. 21, 1978

[54] MICROFICHE CAMERA EDITING DEVICE

[76] Inventor: Harry Arthur Hele Spence-Bate, 1 Cheam Pl., Morley, Australia, 6062

[21] Appl. No.: 729,769

[22] Filed: Oct. 5, 1976

[30] Foreign Application Priority Data

Oct. 6, 1975 United Kingdom .............. 40812/75
Apr. 22, 1976 Australia ........................... 13269/76

[51] Int. Cl.$^2$ ...................... G03B 27/44; G03B 27/52
[52] U.S. Cl. .................................... 355/54; 355/43
[58] Field of Search ...................... 355/53, 54, 64, 18, 355/21, 39, 43, 46, 60, 65, 66, 51, 40

[56] References Cited

U.S. PATENT DOCUMENTS

| 1,368,880 | 2/1921 | Bettini | 355/40 |
| 1,808,123 | 6/1931 | Uher | 355/40 |
| 1,822,417 | 9/1931 | Owens | 355/51 |
| 2,558,605 | 6/1951 | Coutant et al. | 355/43 |
| 2,788,705 | 4/1957 | Huebner | 355/54 |
| 3,286,586 | 11/1966 | Whitney | 355/54 X |
| 3,289,530 | 12/1966 | Samain | 355/43 X |
| 3,773,419 | 11/1973 | Sumner et al. | 355/43 |
| 3,826,571 | 7/1974 | Spence-Bate | 355/43 X |
| 3,907,426 | 9/1975 | Goodliffe | 355/54 X |
| 3,950,094 | 4/1976 | Kano et al. | 355/46 X |

FOREIGN PATENT DOCUMENTS

| 88,539 | 5/1922 | Austria | 355/39 |
| 948,115 | 8/1956 | Germany | 355/46 |

Primary Examiner—Donald A. Griffin
Attorney, Agent, or Firm—Fidelman, Wolffe & Waldron

[57] ABSTRACT

A microform editing and recording device for transmitting a microimage from a first microimage bearing film to a second microform film carried in a microform camera having a stepping arrangement for moving the second film so that the microform image selected from the first microform film can be located in a predetermined frame position on the second film; arrangements are provided for moving the first film with respect to the camera in a frame which is fixedly supported in a housing of the editing and recording device; in one embodiment the frame holding the first film is hinged to the housing and an adaptor can be provided for converting the frame from a microfiche holder to a microfilm holder; in a second embodiment the editing and recording device is brought into use by means of a hinged edit mirror so that the camera can be converted from a conventional microform copying camera to a microform editing and recording camera; in a third embodiment a viewing device is provided to enable the first microform film to be inspected before recording takes place on the second film, which viewing device can be inserted in an optical path between the first and second film; in a fourth embodiment an arrangement for locating the frame in the editing and recording device is provided which consists of a plunger locatable in one of several positions corresponding to frame locations on the first film; a fifth embodiment includes an arrangement for projecting an image from a first film onto a translucent platen which is then recorded by the camera or alternatively the translucent platen may be used in the conventional way for recording documents thereon on a film in the camera.

12 Claims, 13 Drawing Figures

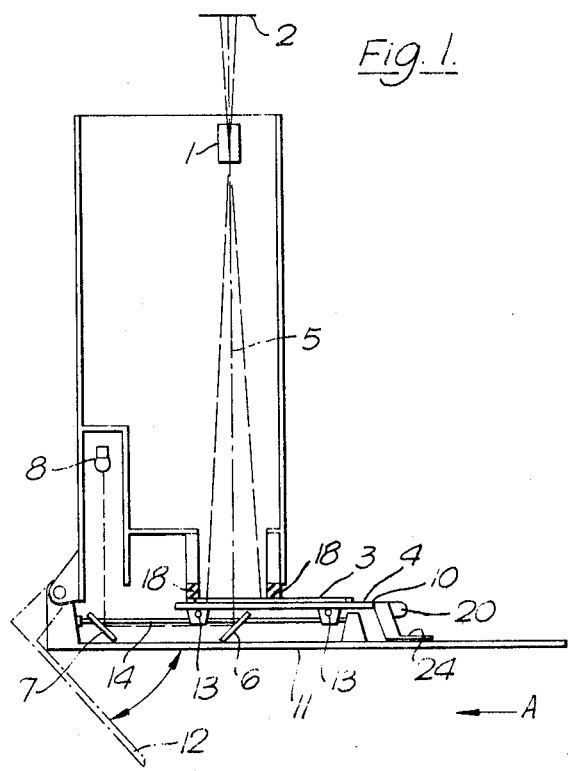
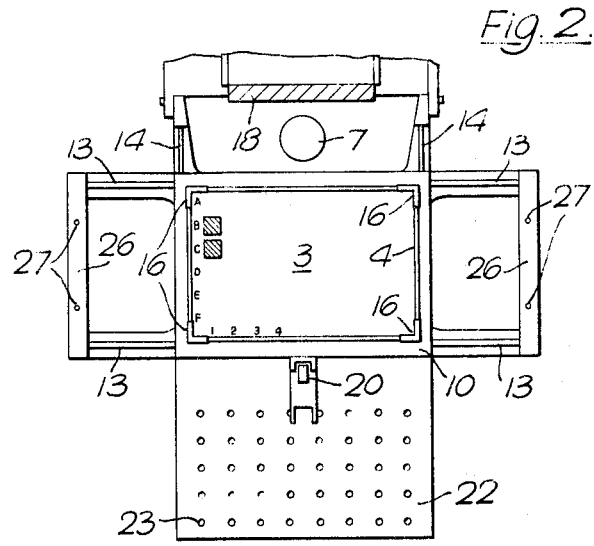

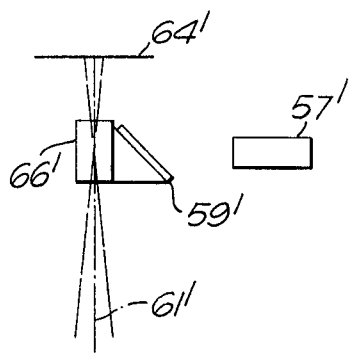
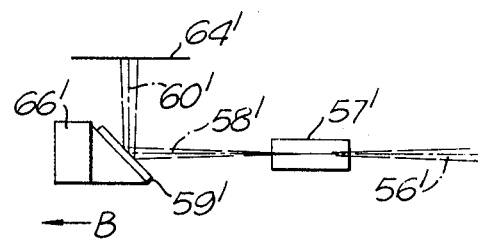
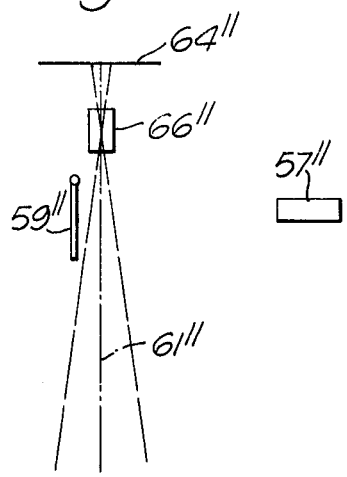
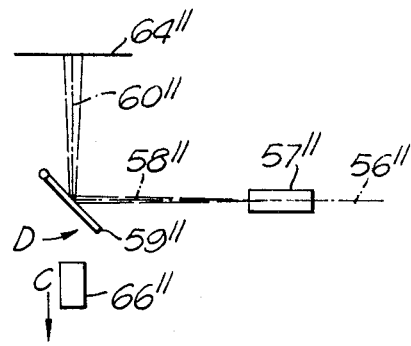

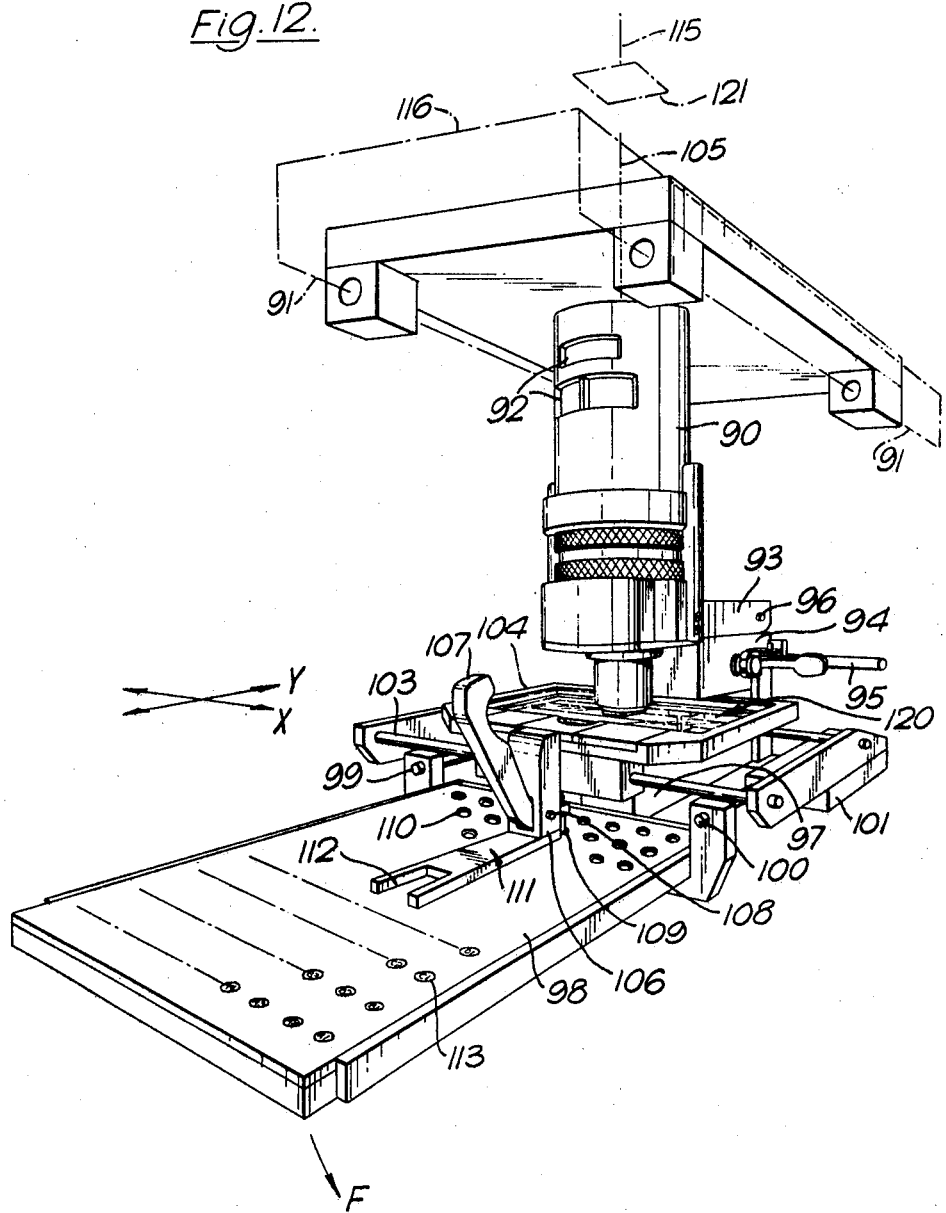

MICROFICHE CAMERA EDITING DEVICE

The present invention relates to microform editing. In the reprographic art the term microform includes microfiche and microfilm.

Editing is the process of deleting or adding to microform records so as to remove unwanted material usually recorded on a separate image on a microfilm or microfiche or to replace old material with new material.

A previous editing device has been disclosed in my co-pending U.S. patent application Ser. No. 497,463. In this previous device the microform film is mounted in a frame which is then inserted in a direction at right angles to the axis of illumination and subsequent recording of the image on the microform film. The manual insertion of the frame can be difficult since it must be accurately located and damage can ensue.

According to the invention there is therefore provided a microform editing and recording device for transmitting a microimage from a first microimage bearing film to a second photographic microform film comprising a microform camera, a housing mounted to said microform camera, a means in said housing for an optical path, a portion of which path is aligned with the optical axis of said camera, a frame fixedly supported by said housing for holding said first film, means for locating said first film in said frame in at least a plurality of predetermined X and/or Y positions relative to said optical path, means in said camera for moving said second film in a plurality of predetermined X and/or Y positions relative to the optical axis of said camera, and means for applying light from said first film to said second film along said optical path, said frame fixedly supported by said housing so that the first film may be removed from the frame while the frame is fixed to the holder.

In a first embodiment of the invention the frame is hinged to the housing for movement from an open position in which the first microimage bearing film can be removed from the device, to a closed position in which the first film is positioned in an editing and recording position.

The first embodiment is designed for holding a first film which is a microfiche film in one mode and can be converted in a second mode for holding a first film which is a microfilm. In the second mode a sub-frame is secured to the frame and carries a feed and receiving reel. The sub-frame can include a turntable mounted for rotation on the sub-frame and the reels are mounted to the turntable.

In the first embodiment the housing of the editing and recording device is mounted to the microform camera by a pivotal arrangement which enables it to be swung away from the camera lens to enable the camera to record conventional documents placed on a recording platen. But in a second embodiment the housing is mounted permanently and unmovingly to the camera and the editing and recording device is brought into use by means of a hinged edit mirror to which the camera lens is also fixed so that in an edit mode an image from the first film is projected through an editor lens onto the edit mirror, bypassing the camera lens, through the camera shutter and mask onto the second film. While in a conventional mode an image of a document on a document copying platen illuminated in the normal way is photographed in a conventional way by the camera lens hinged into camera axis, bypassing the edit mirror, and through the camera shutter and mask onto the second film.

The arrangement of the second embodiment where the editing and recording device is permanently mounted and unmovingly to the camera is advantageous in that only the mirror and camera lens need be moved but has disadvantages in operation in that the device housing has to be located clear of the camera axis at the rear of camera which makes access to the editing and recording device more difficult.

In a first variation of the second embodiment the edit mirror and camera lens are together mounted on a slide rather than hinged.

In a second variation of the second embodiment the edit mirror is hinged and the camera lens is separately mounted on a slide so that the camera lens is moved from a position above the edit mirror which is hinged out of the camera axis in the conventional mode to a position below the edit mirror which is hinged into the path between the edit lens and the shutter in the edit mode.

In a third embodiment in which the editing and recording device housing is mounted in a similar way to the first embodiment to the camera, a viewing device is slidably inserted into the optical path between the first film and second film so that images on the first film can be checked before recording on the second film, the viewing device comprising an eyepiece or screen and a viewing lens mounted to a viewing device housing, the viewing device housing being slidably mounted to the editing and recording device housing so as to place or withdraw the viewing lens in or away from the said optical path.

In a fourth embodiment which is similar to the first embodiment the frame holding the first film is located in X and Y positions by means of a plunger fixed to the frame holding the first film, which plunger engages in holes in a positioner plate. The positioner plate has image position indications provided thereon which can be viewed through a sighting means fixed to the said frame holding the first film. This fourth embodiment is mounted to the camera so that it can be swung away from the camera optical axis.

In a fifth embodiment a microform camera is provided with an editing and recording device incorporated therein. The camera has a camera lens in the front focal plane of which there is provided a translucent platen onto the face of which, opposite to the camera lens, there is arranged to be projected from a first film carried in a moveable frame a microform image.

The invention will now be described with reference to the accompanying drawings, in which:

FIG. 1 shows a cut away side view of a first embodiment of a microform editing and recording device according to the invention;

FIG. 2 shows a front view of part of the device of FIG. 1 as seen from 'A' in FIG. 1 showing the arrangements for holding in the device a microfiche as used in a first mode;

FIG. 6 shows a first variation of the second embodiment showing diagrammatically a lens shift arrangement in the conventional mode;

FIG. 7 shows the first variation of FIG. 6 showing the lens shift arrangement in the edit mode;

FIG. 8 shows a second variation of the second embodiment showing diagrammatically a lens shift arrangment in the conventional mode;

FIG. 9 shows the second variation of FIG. 8, showing the lens shift arrangement in the edit mode;

FIG. 12 is a perspective view of a fourth embodiment of the invention; and

Figure 3:
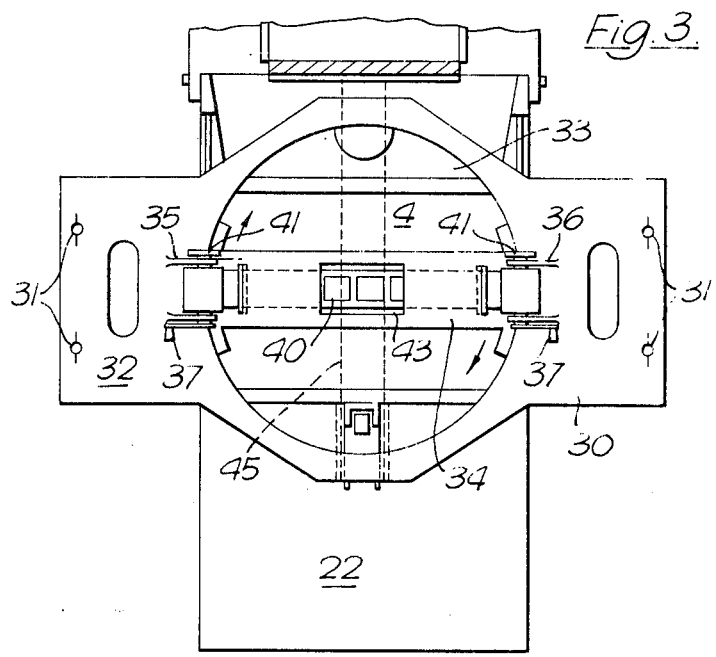
FIG. 3 shows a similar view to FIG. 2, but showing mounted on the device of FIG. 2 an adaptor for holding in the device a microfilm as used in a second mode.

In FIG. 1 there is shown an edit lens 1 of a microform camera which can either be a microfiche or microfilm camera. Preferably the microfiche camera is a step and repeat camera. Above the lens 1 in the back focal plane is a second microform film 2 held in any suitable carriage or by a film platen. The second film is provided with conventional means for X and Y shift in the case of a microfiche film, or X or Y shift in the case of a microfilm. Below the lens 1 in the front focal plane is a microfiche 3 being a first microform film held on a translucent platen 4 so that an image on the microfiche, say image B4, is held in the optical axis 5 of the camera lens 1. Directly below the platen 4 in the optical axis 5 is a mirror 6 which reflects light via a further mirror 7 from light source or means for applying light 8.

The platen 4 is fixed in a carriage 10 which is mounted for movement on a carriage base or frame 11 when the carriage base 11 is hinged downwards to the open position 12. Movement of the carriage 10 on its base 11 is possible in the X and Y direction by the provision of slide bars 13 and 14.

The microfiche 3 is positioned on the platen by means of corner locators 16 and is held flat on the platen 4 by means of foam rubber strips 18.

Location of the microfiche in a selected position under the optical axis 5 is achieved by moving the handle 20 across the indicator plate 22 on which plate are studs or projections 23 on which the base 24 of the handle engage.

The microform camera is provided with the necessary shutter and mask and the device of FIG. 1 can be swung away from the axis 5 for conventional microform photography.

Conversion of the device from a microfiche to microfilm editor can be achieved by mounting on support bars 26 at the side of the device an adaptor 30 as shown in FIG. 3. The adaptor 30 is fixed to the support bars 26 by turnscrews or oddy fasteners 31 which lock the base 32 of the adaptor 30 to holes 27 in the support bars 26.

In the centre of the adaptor base 32 is a hole 33 in which a turntable 34 is mounted, the turntable 34 carries a pair of microfilm reels 35 and 36 which are provided with winding handles 37. Film 40 on the reels 35 and 36 passes through holes 41 in the turntable past suitable rollers to the underside of the turntable so as to lie between the underside of the turntable and the upperside of the platen 4. An aperture 43 is provided in the turntable in alignment when in operation with the optical axis 5. The turntable is rotatable to pre-set positions preferably in the position shown or 90° to the dotted position 45 or a further 90° or 180° so as to invert the image.

Figure 4:
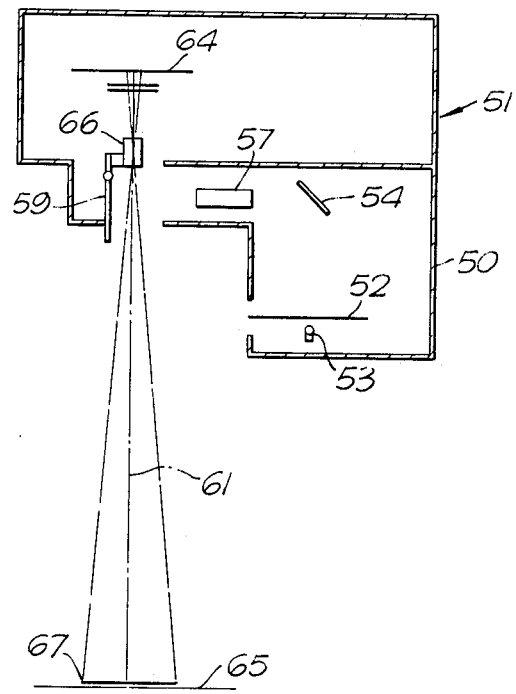
FIG. 4 shows diagrammatically a second embodiment of the invention showing the use of the device in a conventional mode.
Figure 5:
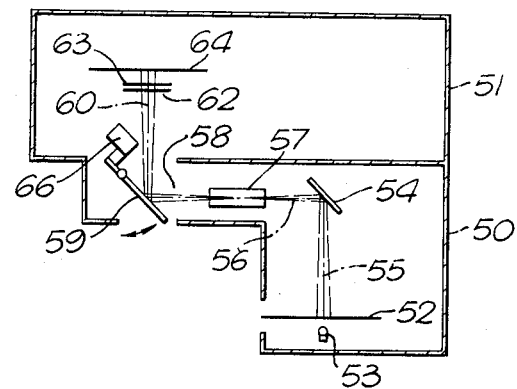
FIG. 5 shows the second embodiment showing the use of the device in an edit mode.

In a second embodiment shown diagrammatically in FIGS. 4 and 5 the editing and recording device 50, the housing of the device is incorporated permanently in a microform camera housing 51. The drawings show a first microform film 52 preferably a microfiche held in a frame in the same way as the first embodiment (though not shown for convenience) so that an image on film 52 can be moved in X and/or Y directions. An illuminating means 53 is provided below the film 52. A first edit mirror 54 is provided to deflect the image on film 52 from path 55 along a path 56 to an edit lens 57. The edit lens 57 projects the image along a path 58 to a second edit mirror 59. In the position shown in FIG. 5 in an edit mode, the second edit mirror 59 then deflects the image up a path 60 in the optical axis 61 of the camera through a shutter 62 and mask 63 to a second film 64 which may be a microfilm but is preferably a microfiche mounted on a conventional step and repeat mechanism for X and/or Y direction movement. If the camera is required to photograph conventional documents on a document platen 65 the second edit mirror 59 is pivotted to an inoperative position as shown in FIG. 4 clear of the optical axis 61 and a camera lens 66 mounted to the mirror 59 is brought into an operative position. The camera is now in a conventional mode for photographing a document 67 in the object plane of lens 66 on the platen 65. The second film 64 can now be exposed by means of the shutter 62 in the conventional manner to record the image of the document 67 on the second film 64.

In a first variation of the optical arrangements of FIGS. 4 and 5 and as shown in FIGS. 6 and 7 a camera lens 66' is slidably mounted with a second edit mirror 59' so that in a conventional mode shown in FIG. 6 the camera lens 66' can record a document image along the optical axis 61'. In an edit mode as shown in FIG. 7 an edit image projected in the same way as FIG. 5 by moving the lens 66' and the second edit mirror 59' in the direction B so that the edit image is projected along path 56' through edit lens 57', along path 58' to mirror 59' and thence along path 60' to a second film 64'.

In a second variation of the optical arrangements of FIGS. 4 and 5 as shown in FIGS. 8 and 9 a camera lens 66" is mounted for movement along the optical axis 61" and a second edit mirror 59" is hingedly mounted. In the conventional mode as shown in FIG. 8 the camera lens 66" records an image along the optical axis 61" and to convert to edit mode, the camera lens 66" is moved downwards in direction C below the second mirror 59" and the mirror 59" is hinged upwards in direction D. The edit image recording path is 56", through edit lens 57", 58" to mirror 59" up path 60" to second film 64".

Figure 10:
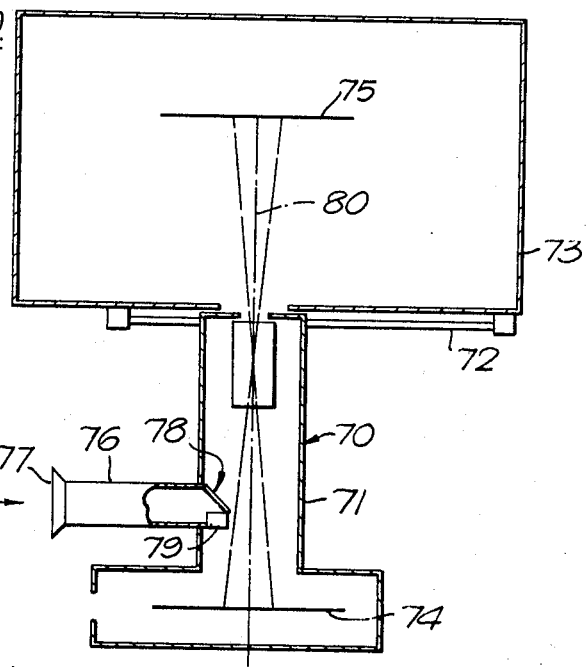
FIG. 10 shows diagrammatically a third embodiment of the invention including a viewing device.
Figure 11:
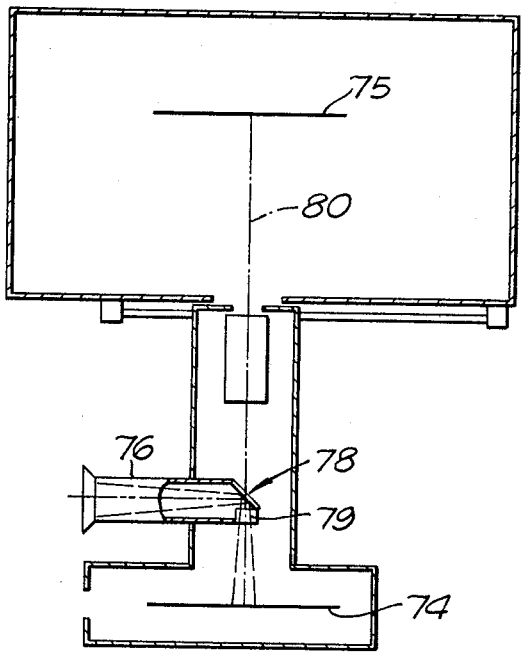
FIG. 11 shows the embodiment of FIG. 10 with the viewing device in an operative position.

FIGS. 10 and 11 diagrammatically illustrate a third embodiment of the invention which incorporates a viewing device insertable into the optical path between the first film and the second film. An editing and recording device 70 is mounted on slide bar 72 attached to the underside of microform camera housing 73. Editing device 70 include a housing 71 having a first microform film 74, preferably a microfiche, held in a frame as described with reference to FIGS. 1 and 2. The frame is adapted for movement in the X and the Y direction so that an image on film 74 can be positioned in the optical axis 80 of the camera.

An illuminating means (not shown) is provided below film 74 to project an image carried on the film upwardly along the optical axis 80, through edit lens 81, and onto second film 75. Film 75 may be a microfilm but is preferably a microfiche mounted on a conventional step and repeat mechanism for X and/or Y direction movement. Mounted on housing 71 is a viewing device having a housing 76 which is adapted to be slidably inserted into the optical path 80 between first film 74 and second film 75. The viewing device comprises an eyepiece or screen 77, a viewing lens 79 and a deflection mirror 78. FIG. 11 shows the viewing device in the operative position intersecting the image projected from film 74. In this position, the image on the first film may be checked before it is recorded on the second film. Thereafter, the viewing device is retracted to the position shown in FIG. 10 and the image is then recorded on the second film.

The housing 90 of the editing and recording device of FIG. 12 is mounted on horizontal slide bars shown diagrammatically as lines 91 to the camera housing in the same way as the FIGS. 10 and 11 arrangement. The housing which has a tubular upper part has an editor lens and aperture adjustment window 92.

Fixed to the lower part of the tubular upper part of the housing 90 is a bracket 93 to which a frame support bracket 94 is hingedly mounted and secured in an upper operative position by a latch 95. The hinging movement takes place about a pivot 96. Attached to the frame support bracket 94 is a light or illumination box 97 which extends to and partly supports a positioner plate 98. Supported between the positioner plate 98 and an extension of the frame support bracket 94 are slide rails 99 and 100 which extend in the Y direction. Mounted on the slide rails 99 and 100 is a carriage 101 which carries X direction slide rails 102 and 103, which in turn carry a first film carriage 104. By means of the X direction and Y direction slide rails the first film carriage 104 is enabled to be positioned in an X and Y direction relative to the housing 90. The illumination box 97 carries a lamp (not shown) projecting a light beam in the Y direction in a similar fashion to the first embodiment, the light beam is then projected upward into the optical axis 105 of the device by a mirror (not shown) at the positioner plate end of the illumination box 97. Fixed to the first film carriage 104 which carries the first film, being in this case a microfiche, is a positioner plunger bracket 106 which carries a plunger latch 107 pivotally mounted at 108. On the lower end of the plunger latch 107 is a plunger 109 which is arranged to be resiliently urged into engagement with location holes 110 provided in the positioner plate 98. Also in the plunger bracket 106 is an extension 111 having at its end an aperture 112 through which location identification indexes 113 may be viewed.

To operate the editing and recording device of FIG. 12 the device is slid along the slide bars shown diagrammatically as lines 91 so that the optical axis 105 of the device coincides with the optical axis 115 of the camera indicated diagrammatically by broken lines 116. The latch 95 is operated to allow the frame support bracket 94 together with carriage 104 and positioner plate 98 to hinge downwardly in direction F. A microfiche 120, an image on which is to be recorded on a second microform film 121 held in the camera on suitable X and Y shift step by step carriages, is located on the first film carriage 104 as shown. A specific image, for instance C2, is selected for the editing process by moving the plunger latch across the positioner plate as required. The plunger 109 is engaged in a location hole 110 and the carriage 104 and positioner plate 98 are returned to the operative position shown in FIG. 12. The camera shutter (not shown) is then operated and a required frame on microform film 121 is then exposed to the selected image C2 chosen by the operator. The editing and recording process is then continued by shifting the film 121 and the film 120 as required.

It should be noted that in FIG. 12 the housing 90 is mounted to the camera 116 by means of rails 91 which allow the device to be moved from an operative to an inoperative position or vice versa. However, any suitable form of mounting of the device to the camera can be used, such as a hinged or swivelling mounting, and this method of mounting is determined by the stowage facilities of the device in the area of the camera head. The method of location of the first film carriage 104 has been found to be particularly advantageous since this is both positive and accurate, and this arrangement is applicable to the other embodiments shown and described in the previous specification.

Figure 13:
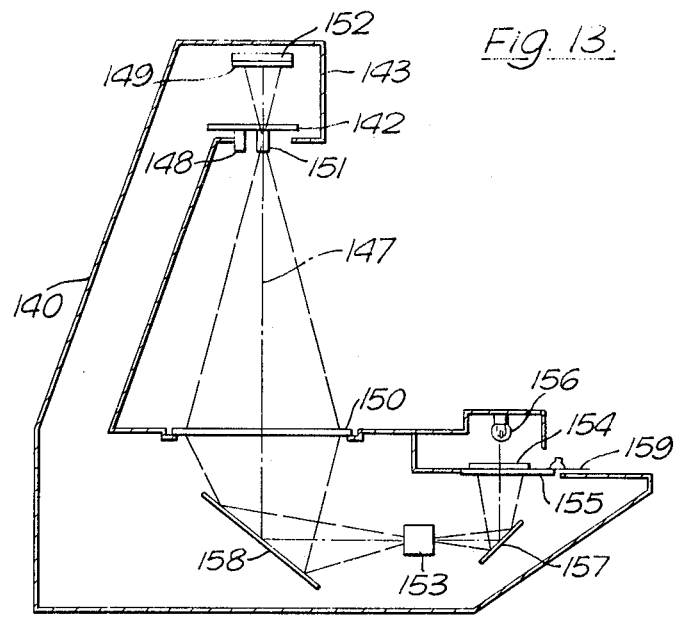
FIG. 13 is a diagrammatic side view of a fifth embodiment of the invention.

In FIG. 13 a fifth embodiment of the invention is shown in which an editing and recording device is permanently in position in a microform camera 140. The device uses a back projection system and a translucent platen 150 is provided below an edit lens 151, mounted on a turret 142 in a head 143 of the camera 140 in the front focal plane of the lens 151. A microform film holder, specifically in this case a microfiche film holder, is provided in the back focal plane of the lens 151 to carry microfiche 149, which is moveable on the film holder 152 in an X and Y direction. Below the platen 150 is a back projection lens 153 which projects an image from a first microform film 154, carried on a further translucent editing platen 155. The first microform film 154 is illuminated by a light 156 and the back projection path is via mirrors 157 and 158 onto the back of the translucent platen 150. A suitable means 159, such as is shown in the previous embodiment, is provided for moving the first microform film 154 in the X and Y axis.

The operation of the device shown in FIG. 13 is similar to the previous embodiments, but it will be appreciated that a change from an edit mode to a conventional recording mode does not entail the necessity of moving the editor device, and conventional documents can be recorded by placing them on the platen 150 and rotating the turret 142 to bring a further lens 148 into the optical axis 147.

It will be appreciated that each of the devices shown and described not only provide a ready means of editing which includes up-dating, but it is also possible to use the devices for transferring microfiche to microfilm and vice versa, and also for changing records of one standard of film to another.

We claim:

1. A microform editing and recording device for transmitting a microimage from a first microimage bearing film to a second photographic microform film, comprising a microform camera, a document platen aligned with the optical axis of said camera, a housing for an optical path, a portion of which path is adapted to be removably aligned with the optical axis of said camera, a frame fixedly supported by said housing for holding said first film, means for locating said first film in at least a plurality of predetermined X and/or Y positions relative to the optical axis of said camera, and means for applying light from said first film to said second film along said optical path, said housing pivotally mounted to said camera so that it can be removed from the camera optical axis to enable the camera to record documents placed on said document platen, said frame fixedly supported by said housing so that the first film may be removed from the frame while the frame is fixed to the housing.

2. A device as claimed in claim 1 wherein the frame is hinged to the housing for movement from an open position in which the first film can be removed from the device, to a closed position in which the first film is positioned in an editing and recording position.

3. A device as claimed in claim 1 wherein a sub-frame is secured to the frame, which sub-frame carries a feed and receiving reel for the first film being a microfilm.

4. A device as claimed in claim 3 wherein the sub-frame includes a turntable mounted for rotation on the sub-frame and the reels are mounted to the turntable.

5. A device as claimed in claim 1 wherein a viewing device is provided, the viewing device comprising an eyepiece or screen and a viewing lens, mounted to a viewing device housing, the viewing device housing being slidably mounted to the editing and recording device housing so as to place the viewing lens in or away from said optical path between the first and second film.

6. A device as claimed in claim 1 wherein the frame holding the first film is located in predetermined X and Y positions by means of a plunger fixed to the frame, which plunger engages in holes in a positioner plate, and wherein the positioner plate has image position indications provided thereon which can be viewed through a sighting means fixed to said frame.

7. A microform editing and recording device for transmitting a microimage from a first microimage bearing film to a second photographic microform film, comprising a microform camera; a document platen aligned with the optical axis of said camera; a housing for an optical path fixed to said camera, a portion of which path is aligned with the optical axis of said camera; a frame fixedly supported by said housing for holding said first film; means for locating said first film in a plurality of predetermined X and/or Y positions relative to the optical axis of said camera, and means for applying light from said first film to said second film along said optical path, said means comprising an edit mirror arranged to be moved into the optical axis of the camera, so that light from said first film is applied to the second film, and out of the optical axis of the camera to enable the camera to record documents placed on said document platen, said frame fixedly supported by said housing so that the first film may be removed from the frame while the frame is fixed to the housing.

8. A device as claimed in claim 7 wherein the edit mirror is hinged for movement into the optical axis of the camera and wherein a camera lens is mounted to the edit mirror so that in an edit mode the camera lens is out of alignment with the optical axis and in a conventional mode the camera lens is hinged into the optical axis while the edit mirror is hinged out of the optical axis.

9. A device as claimed in claim 7 wherein the edit mirror is slidable for movement into the optical axis of the camera and wherein a camera lens is mounted to the edit mirror so that in an edit mode the camera lens is out of alignment with the optical axis and in a conventional mode the camera lens is slid into the optical axis while the edit mirror is slid out of the optical axis.

10. A device as claimed in claim 7 wherein the edit mirror is moveable into the optical axis while a camera lens is separately moveable in the optical axis from an operative position in a conventional mode to an inoperative position shielded by the edit mirror in an edit mode.

11. A microform camera incorporating an integral editing and recording device for transmitting a microimage from a first microimage bearing film to a second photographic microform film comprising a camera housing and lens; a translucent platen situated in the front focal plane of said lens; a frame supported by said housing for holding said first film; means for locating said first film in at least a plurality of predetermined X and/or Y positions relative to the optical axis of said camera and means to project a microform image from said first film onto the face of said translucent platen opposite to the camera lens so that said image can be recorded onto said second film carried on a movable frame in said camera.

12. The camera of claim 11 wherein said translucent platen is adapted to hold a document on that face nearest said camera lens whereby an image of said document can be recorded onto said second film.

* * * * *